July 18, 1950        R. R. DUPLER        2,515,401
ILLUMINATED GLOBE STRUCTURE
Filed March 17, 1948        2 Sheets-Sheet 1
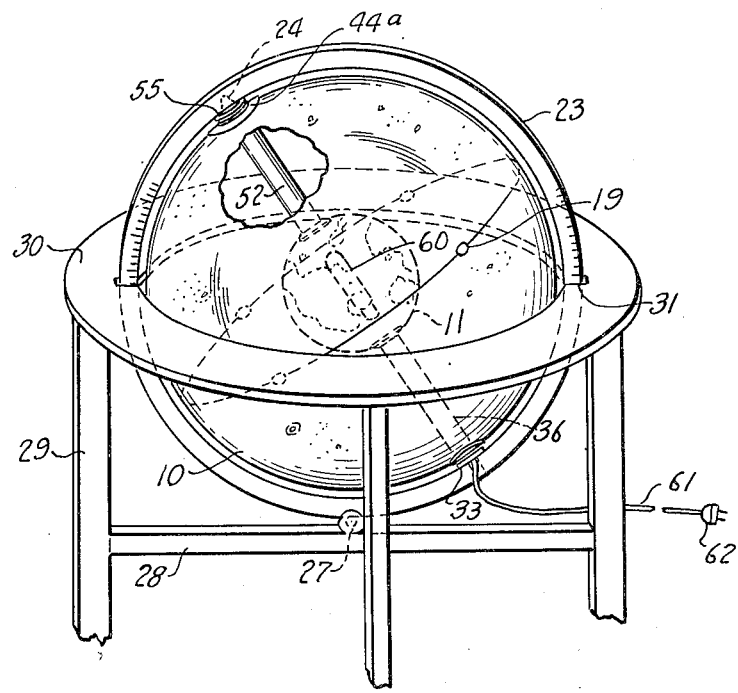
FIG. 1.
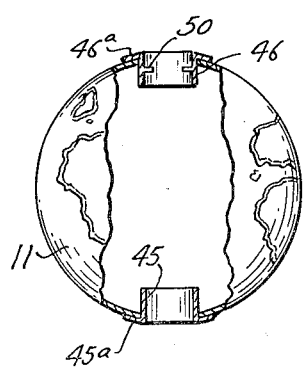
FIG. 2.
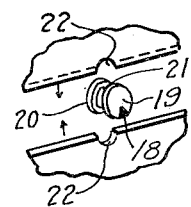
FIG. 3.
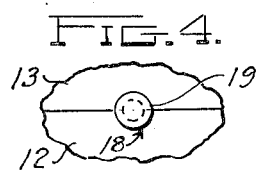
FIG. 4.
INVENTOR.
Raymond R. Dupler
BY
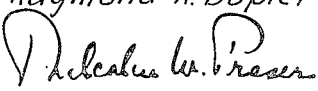
ATTORNEY July 18, 1950  R. R. DUPLER  2,515,401
ILLUMINATED GLOBE STRUCTURE
Filed March 17, 1948  2 Sheets-Sheet 2
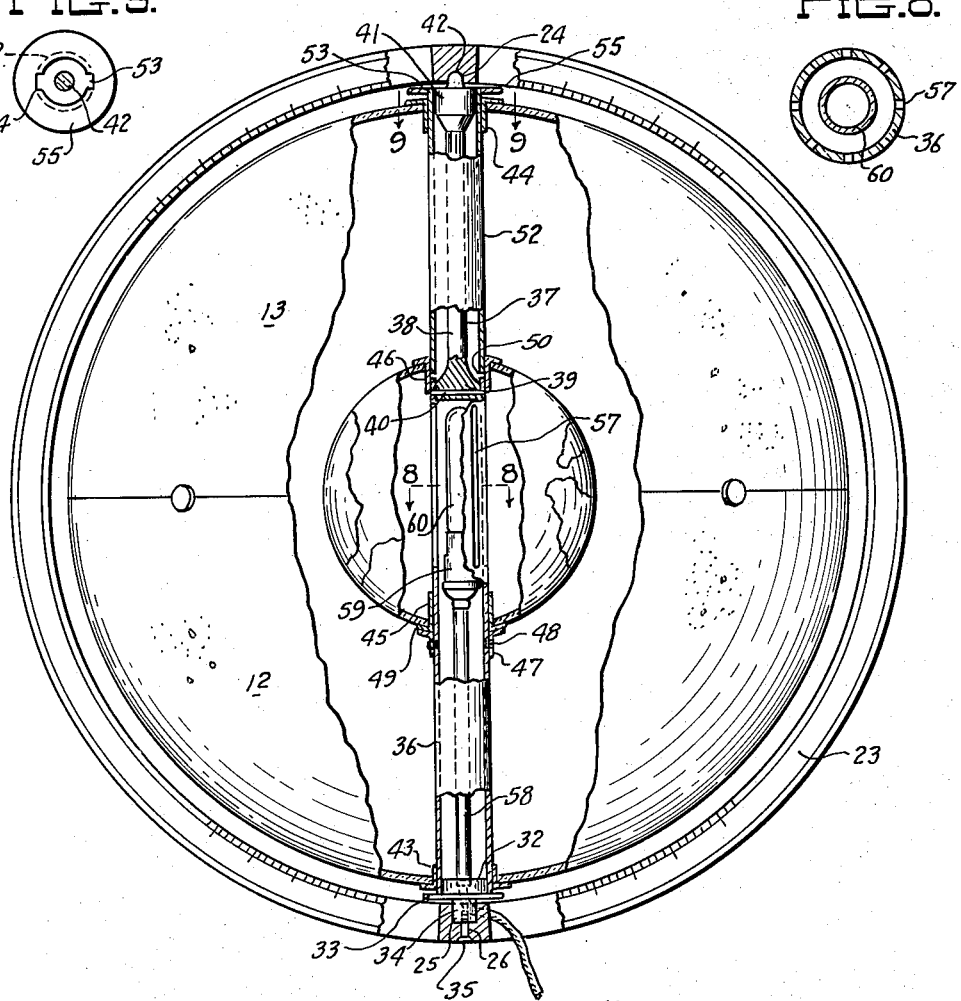
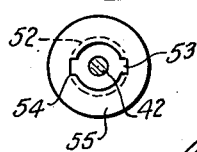
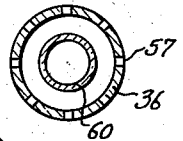
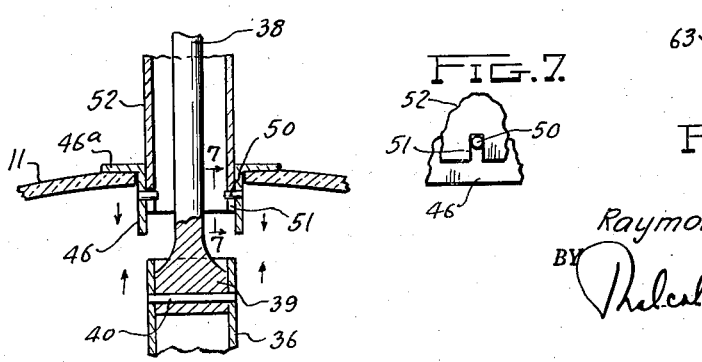
INVENTOR.
Raymond R. Dupler
BY
ATTORNEY Patented July 18, 1950

2,515,401

UNITED STATES PATENT OFFICE 2,515,401

ILLUMINATED GLOBE STRUCTURE

Raymond R. Dupler, Toledo, Ohio

Application March 17, 1948, Serial No. 15,454

4 Claims. (Cl. 35—46)

This invention relates to globe structures and it is an object of this invention to produce a globe structure in which a pair of global spheres are mounted one within the other for independent rotational movement about a common axis.

Another object is to produce a globe structure wherein two global spheres of large and small diameter are concentrically mounted for independent rotational movement about a common axis both of said global spheres being at least translucent so that figurations on the inner sphere are discernable through the outer sphere having markings thereon for determining certain information; such for example, as when the inner sphere has a terrestrial map and the outer a selestial map, for determining the relative position between the earth and the heavenly bodies as a guide in navigation.

A further object is to produce a globe structure of the character described in which the concentrically mounted globes are supported for rotational movement together about an axis which is normal to the axis of their independent rotation.

A still further object is to produce a globe structure of the type described wherein the globe spheres are at least translucent with a light source removably mounted within the inner sphere to facilitate the reading thereof through the outer sphere.

A still further object is to produce a globe structure of the type described wherein means externally of the outer sphere may be employed for independently rotating the inner sphere.

Another object is to produce a new and improved mounting means for simply joining two separable hemispherically shaped shells into a sphere which for all practical purposes has the attributes of a unitary structure.

A still further object is to produce a new and improved illuminated globe having mounting means which facilitates the assembly of one globe within another in a manner to enable independent rotational movement thereof about a common axis and rotational movement thereof together about an axis normal to the common axis and including a light source removably positioned within the inner globe.

These and other objects and advantages of this invention will hereinafter appear and for purposes of illustration but not of limitation, an embodiment of the invention is shown in the accompanying drawings in which, Figure 1 is a perspective view of a globe structure embodying the features of this invention;

Figure 2 is an elevational view partially in section of the smaller sphere having a terrestrial map thereon;

Figure 3 is a detail view illustrating the association of parts employed for holding the hemispherical shells together;

Figure 4 shows the elements of Figure 3 in the assembled relation;

Figure 5 is an elevational view partially in section of the globe assembly apart from the globe support;

Figure 6 is a detail enlarged view showing the relationship of parts in the upper region of the inner sphere;

Figure 7 is an elevational view taken along the lines 7—7 of Figure 6;

Figure 8 is a sectional view taken along the lines 8—8 of Figure 5;

Figure 9 is a sectional view taken along the lines 9—9 of Figure 5;

Figure 10 is a fragmentary view of the meridian ring.

Referring now to the drawings, 10 designates the outer sphere and 11 the inner sphere, and these spheres are supported for independent rotational movement about a common axis in a manner later to be described. Maps or other figurations are provided on each sphere, and in order to enable the inner to be discernable and readable through the outer sphere, the latter sphere is formed of at least translucent, but preferably of transparent material, while the other sphere may be opaque unless illuminating means are disposed therein, in which case the inner globe is also formed of at least translucent material.

In order to enable the desired amount of light transmission through the spheres, they are fabricated of such material as glass, plastics or the like. With such materials, it is possible to manufacture each of the spheres in one piece, or from pairs of fitting hemispherical shells, the latter method being preferred for the outer sphere and where the spheres are of a size that is difficult accurately to fabricate in one piece, such as when their diameter exceeds twelve inches. In specific applications of the invention, the inner sphere 11 is formed in one piece with a pair of apertures 14 and 15 in diametrically opposed relation, while the outer sphere 10 is formed of two hemispherical shells 12 and 13 each having an aperture 16 and 17 respectively in the base thereof; the apertures being located in positions corresponding to the north and south pole positions of the assembled globe.

The two hemispherical shells are held together by connectors 18 formed of a pair of facing disc members 19 and 20 joined by a link 21 of a length corresponding to the thickness of the shell. Notches 22 are provided at uniformly spaced apart portions of the meeting edges of each shell, and when the hemispherical sections are brought together into the assembled relation, the notches in one shell are superimposed over the respective notches in the other to form openings which are substantially filled by the link 21; the flanges 19 and 20 abutting the inner and outer walls respectively of the assembled hemispherical shells. Thus, the connectors operate to hold the hemispherical shells against relative rotational and horizontal movement. If it is desired to make the assembly more permanent, suitable adhesives may be applied to the meeting edges of the shells and to the engaging surfaces of the connectors. It is to be understood that the link may be rod like as illustrated, or of any other sectional contours corresponding with that of the openings formed by the contiguous notches, the disc like elements might equally be formed of other shapes and contours capable of engaging the adjacent opposite walls of the hemispherical sections.

Mounting the spheres for rotational movement is a meridian ring 23, having a notch 24 and a laterally extending groove 25 formed in diametrically opposed relation in its inner wall. An aperture 26 through the ring intersects the groove 25. The meridian ring is in turn rotatably supported on a roller 27 that engages the outer rim of the ring 23 as a track. The roller is fixed to a cross piece 28 of a table 29 having a top 30 that appears as a horizontally disposed rim with guide slots 31 therein in vertical alignment with the roller for receiving the meridian ring in sliding relation. In the assembled position, the meridian ring with its mounted spheres may be rotated through an angle of 360° with respect to its table support.

An important feature of this invention resides in the means mounting the spheres for rotational movement about a common axis within the meridian ring. For this purpose, there is provided an adapter consisting of a cylindrical stub section 32 having an annular flange 33 in the base thereof and a depending shank 34 that is adapted to seat within the groove 25 formed in the meridian ring. The adapter is held in place by a set screw 35 that engages the underside thereof through the aperture 26.

Riding on the bearing surface of the flange 33 is a tubular shaft 36 that seats about the stub section 32. The tubular shaft may be formed of a length to extend to the opposite wall of the meridian ring, but preferably it is formed to extend slightly over half way across while an extension 37 takes up the remaining distance. The extension is in the form of a rod-like member 38 having an enlarged section 39 at one end thereof that telescopes the end portion of the tubular shaft and is removably secured thereto for concomitant movement by a pin 40 insertable through registered openings through the tubular shaft and the telescoping portion 39 of the rod-like extension. The other end of the rod-like member has a cylindrical enlargement 41 of lesser diameter than the first, and a bearing pin 42 on the end thereof adapted rotatably to be received in the notch 24 in the meridian ring.

The assembled tubular shaft and the extension described provide a rigid axial support that is rotatable with respect to the meridian ring and the adapter. For purposes of mounting each of the spheres 10 and 11 on the axial support, bushings 43, 44, 45 and 46 are fixed in the respective openings 14, 15, 16 and 17 by annular flanges 43ª, 44ª, 45ª and 46ª in sealing engagement with the adjacent outer walls of the spheres. In the mounted position, the bushing 43 of the outer hemispherical shell firmly grips the tubular shaft 36 in the region adjacent the lower end thereof; if the bushing however, loosely fits about the tubular shaft it may rest on the bearing surface of the flange 33 for turning movement relative thereto. The upper bushing 44 receives the enlargement 41 in spaced relation.

The inner sphere 11 is supported in the desired position on the tubular shaft by means of another adapter consisting of a sleeve section 47 that is longitudinally adjustable on the tubular shaft and is held thereon by one or more set screws 48 that engage some of a series of openings along the shaft. The bushing 45, fixed to the lower portion of the inner sphere, rides upon the upper bearing surface of the annular flange 49 integral with the sleeve section 47, the bushing loosely fitting about the shaft 36 to enable relative movement thereof when desired. The other bushing 46 is provided with one or more inwardly projecting pins 50 which are adapted to be received by vertically extending slots 51 on the lower end portion of a vertically deposited tubular member 52 which may be co-extensive with the shaft 36 and concentric with the extension 37. The tubular member is of a length enabling the upper end portion thereof to be disposed between and rotatable relative to the bushing 44 and the cylindrical enlargement 39. Segments 53 on the end of the tubular member project beyond the outer sphere and engage notches 54 in a knurled turning disc having an opening 56 through which the cylindrical enlargement is free to extend. As described, the tubular member is rotatable relative to the bushing 44 and the extension 37, concomitantly to impart rotational movement to the inner sphere through the described pin engagement.

When it is desired to illuminate the spheres, a plurality of openings or slots 57 are provided in the portion of the tubular shaft 36 disposed within the inner sphere 11. A light fixture consisting of an elongate section of tubing 58, one end of which threadably engages the stub 32 while the other end supports a socket 59, is positioned within the tubular shaft 36 so as to mount a light bulb 60 within the inner sphere. The electrical cord 61 with the plug 62 on the end thereof may be threaded through suitable openings in the stationary adapter and through the tube 58 to the socket member 59.

The construction of the globe might best be understood from a description of its assembly. For this purpose, it is expedient first to position the lower hemispherical shell 12 relative to the tubular shaft 36 already having the extension 37 pinned thereto. The tubular shaft may be positioned upon the adapter apart from the meridian ring, and then the adapter 47 is thereafter secured to the tubular shaft in position to support the inner sphere concentrically of the outer shell. The inner sphere 11 is strung over the end of the extension and slipped longitudinally along the axial support until the bushing 45 comes to rest upon the bearing surface 47, following which the tubular member 52 is telescoped about the extension until the pins 50 on the bushing 46 seat in the slots 51.

The connectors are then disposed in the notches 22 spaced about the hemispherical shell 12 and the other hemispherical shell 13 is brought into fitting relation to form the outer sphere, the notches of the shell 13 receiving the upstanding portions of the links 21, while the bushing 44 engages the outer wall of the tubular member 52 in bearing relation. The knurled turning disc may then be dropped over the pin 24 and into engagement with the projections 53 of the tubular member 52.

The thus assembled spheres, which are rotatable independently of each other about their common axis, may be positioned in the meridian ring simply by inserting the bearing pin 42 into the notch 24 and then shifting the shank 34 laterally into the slot 25 wherein it is engageable by the screw 26.

When it is desired to insert, remove or repair the illuminating elements, the meridian ring is turned in its support until the slotted portion 25 is uppermost. The set screw is then removed and the released adapter is swung laterally until the adapter is free of the meridian ring, whereafter, it may be disengaged from the tubular sleeve 36 to enable the desired incorporation or repair of the illuminating means or the insertion of other illuminating elements as a part of the same adapter or another adapter of substantially the same construction.

From the description, it will be obvious that when the inner sphere is provided with a map of the earth and the outer sphere is provided markings indicating the celestial bodies in relative position as they might appear in space about the earth, a general perspective of the relationship therebetween is enabled for various periods of time. This is extremely beneficial not only for educational purposes, as in the teaching of the relative positions of the celestial bodies with respect to the various points on the earth at various times, providing a simple means for understanding the composition of the universe, but it may also be used as a guide in navigation. In the latter instance, when it is desired to secure an exact reading with respect to relative positions on the spheres, a sight may be taken radially at any desired angle through the meridian ring, which for this purpose, may be formed of laterally spaced apart ring members 60 and 61 bonded together by radially disposed ribs 62 therebetween.

It is to be understood that invention is not to be limited to the particular markings on maps described, but other figurations may equally be employed for accomplishing a wide variety of results; for example, the outer sphere may be provided with latitude and longitude lines or it may be provided with a network of lines that are indicative of relative distances. In these instances, it is better to form the inner sphere of larger diameter so as to dispose the map gores in close proximity to the inner wall of the outer sphere. The described mounting means will suffice, whether the inner sphere is large or small. Further, instead of providing the entire world on one sphere, a portion thereof may be impressed on one or the other for various purposes to be used in combination with markings on the other sphere.

A cardinal feature of this invention resides in the simplicity of construction of a globe having relatively few readily assembled parts mounting one sphere within another so that the pair are rotatable independently of each other about a common axis and rotatable together about another axis normal to their common axis, thereby to expose any portion of the globe to the observer. The mounting means described enables the globe to be readily assembled and disassembled by the most inexperienced operator to enable assembly, repair or replacement of parts, as the case may be. There is also provided removable illuminating means within the inner sphere to lend a desired affect and to facilitate the reading of the map from a point outside of the outer sphere and in relation to the figurations thereon.

It is to be understood that numerous changes may be made in the details of construction, arrangement and operation of the globe without departing from the spirit of the invention, especially as defined in the appended claims.

What I claim is:

1. A globe structure comprising a support, a pair of hollow translucent spheres arranged one within the other and each having a pair of apertures in diametrically opposed relation, sleeves fitting each of said apertures, an elongate member extending through said apertures including a laterally apertured portion which extends through the inner sphere, a bushing longitudinally adjustable on said elongate member for rotatably positioning the inner sphere concentric with the outer sphere, adapter means for rotatably mounting one end of the elongate member on the support, a pin on the other end of the elongate member for rotatably engaging the support, and means for imparting rotational movement to the inner sphere independently of the outer sphere.

2. A globe structure as claimed in claim 1 in which a lighting fixture forms a part of the adapter and extends through the tubular portion of the elongate member to be disposed adjacent the laterally apertured portion within the inner sphere.

3. A globe comprising an outer translucent globe, an inner hollow translucent globe, a support, an elongate sleeve extending through an aperture in the outer globe into an aperture in the inner globe, a bushing in the inner globe providing a bearing for said sleeve, a second sleeve having bearing in said bushing extending through said inner globe and the opposite end of said outer globe, a mounting on said support for the outer end portion of said second sleeve, a rod in said first sleeve having its inner end fixed to said second sleeve and its outer end in bearing contact with said support, and an operative connection between said adapter and said first sleeve enabling concomitant rotational movements thereof.

4. A globe as claimed in claim 3, comprising apertures in lateral portions of said second sleeve, a lighting fixture in said second sleeve having the lamp thereof adjacent said apertures, and a bearing mounting associated with said fixtures intermediate the outer globe and said mounting.

RAYMOND R. DUPLER.

REFERENCES CITED

The following references are of record in the file of this patent:

UNITED STATES PATENTS

| Number | Name | Date |
| --- | --- | --- |
| 71,830 | Williamson | Dec. 3, 1867 |
| 2,107,418 | Keller | Feb. 8, 1938 |
| 2,142,305 | Davis | Jan. 3, 1939 |
| 2,355,304 | Koch | Aug. 8, 1944 |